March 26, 1968  R. A. BOUCHER  3,374,629
HIGH EFFICIENCY PARALLEL RAIL ACCELERATOR
Filed July 28, 1965  3 Sheets-Sheet 1

INVENTOR.
ROLAND A. BOUCHER,
BY
Walter J. Adam
ATTORNEY.

March 26, 1968     R. A. BOUCHER     3,374,629
HIGH EFFICIENCY PARALLEL RAIL ACCELERATOR
Filed July 28, 1965     3 Sheets-Sheet 2

INVENTOR.
ROLAND A. BOUCHER,
BY
Walter J. Adam
ATTORNEY.

United States Patent Office 3,374,629
Patented Mar. 26, 1968

3,374,629
HIGH EFFICIENCY PARALLEL RAIL ACCELERATOR
Roland A. Boucher, Los Angeles, Calif., assignor to Hughes Aircraft Company, Culver City, Calif., a corporation of Delaware
Filed July 28, 1965, Ser. No. 475,550
6 Claims. (Cl. 60—202)

This invention relates to propulsion engines useful for space vehicles and particularly to an improved high efficiency and low weight electro-magnetic thrust device utilizing the principle of plasma parallel rail accelerators.

Conventional arrangements that have been considered or utilized for propulsion and attitude control of space vehicles include ion engines, chemical rocket engines and plasma rail accelerators in which pulses of plasma are injected between two current conducting bars. Important considerations of electrical space engines are the specific impulse range which is the number of seconds that one pound of fuel will produce one pound of thrust and the specific power which is the kilowatts of energy required per pound of thrust. The specific impulse is a measure of the fuel weight that must be carried and the specific power is a measure of the weight and size of the electrical power supply. The ion engine is useful and has an acceptable electrical efficiency when operated at a specific impulse of over 5000 seconds but in lower specific impulse ranges due to its poor electrical efficiency, it has an excessive weight principally from the power supply. Conventional parallel rail accelerators operate at a specific impulse such as above approximately 5000 seconds but with a relatively high specific power caused by the low efficiency. Chemical rocket engines cannot operate above a specific impulse of about 400 seconds. Thus, conventional thrust devices do not provide operation with a satisfactory total weight in the specific impulse range of 1000 to 5000 seconds. Thrust engines are useful in the 1000 to 5000 specific impulse range for attitude control of medium size space vehicles and short range propulsion of relatively small space vehicles such as communication satellites. For any specific impulse requirement which may be determined by the range of operation, it is desirable that a space engine be utilized with a minimum total weight including the power supply and fuel. Advantages of some thrust engines such as parallel rail accelerators are that the specific impulse may be varied during operation without requiring excessive equipment and substantially no electrical warm up time is required for operation.

It is therefore an object of this invention to provide an electrically efficient thrust engine operable in a moderate specific impulse range.

It is a further object of this invention to provide a thrust engine that is relatively light in weight and simple in construction.

It is a still further object of this invention to provide a thrust engine that has a relatively high electrical efficiency in the useful specific impulse range of 1000 to 5000 seconds with a minimum of weight and size required for the power supply.

It is another object of this invention to provide a thrust engine which operates with a variable thrust and a specific impulse.

The plasma rail accelerator in accordance with the principles of this invention, includes an energy source such as an energy storage capacitor charged by a power supply, two parallel conducting rails and a magnetic enclosure around the rails for directing the magnetic field between the rails to provide a relatively large inductance per unit length thereof. A valve arrangement introduces pulses of propellant between the accelerator rails at first ends thereof and an arc is formed thereat as the propellant ionizes into a plasma. The current surge produced by the discharge of the capacitor through the arc creates a relatively strong magnetic field between the rails which reacts with the arc current to force the arc and plasma down the rails at a high velocity and apply a forward thrust to the parallel rail structure. The accelerator provides a high electrical effiiciency or ratio of useful kinetic energy to electrical energy over wide ranges of specific impulse including the range of approximately 1000 to 5000 seconds.

The novel features of this invention, as well as the invention itself, both as to its organization and method of operation, will best be understood from the accompanying description, taken in connection with the accompanying drawings, in which like reference characters refer to like parts, and in which.

Figure 4:
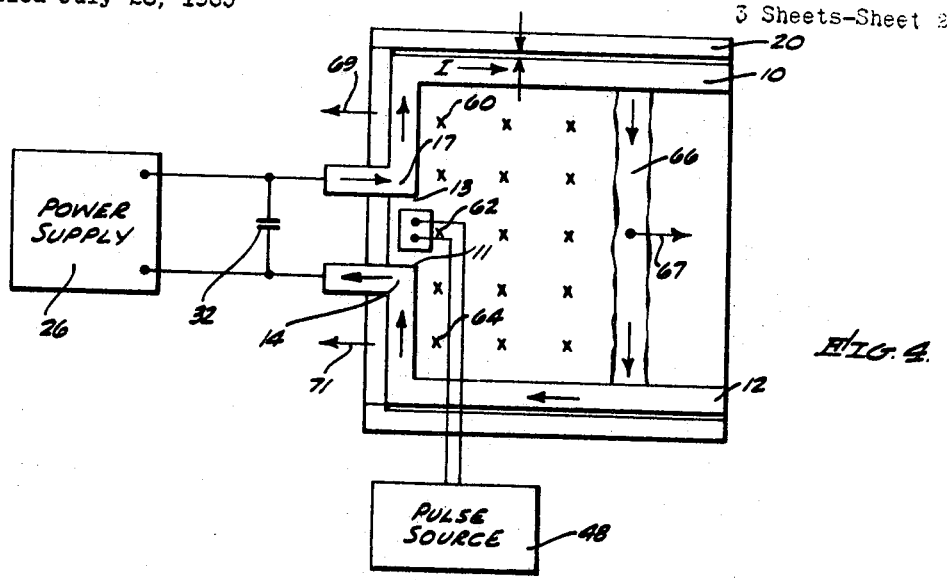
Figure 5:
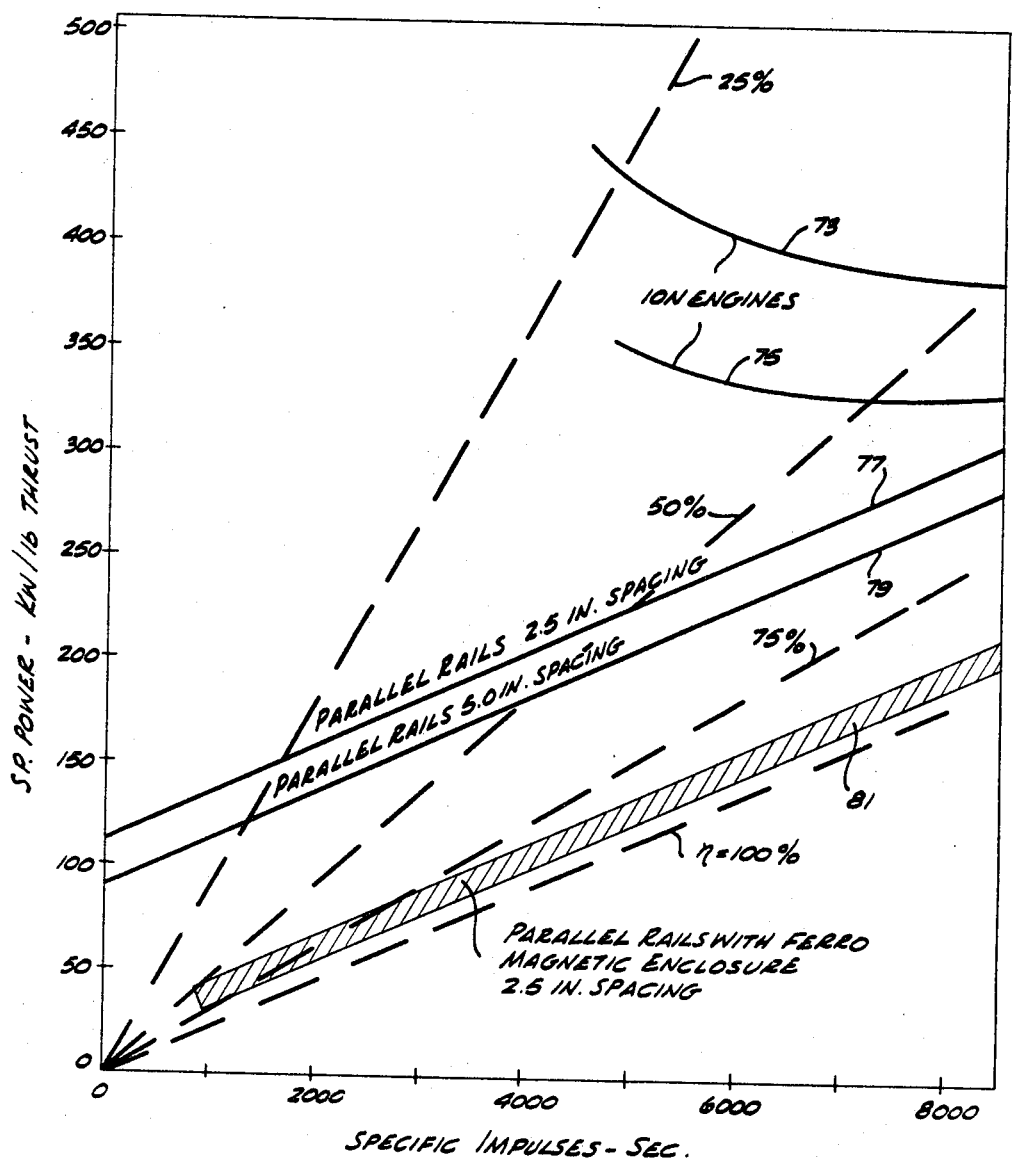

FIG. 4 is a schematic diagram of the improved plasma rail accelerator for further explaining the operation thereof in accordance with the principles of the invention; and FIG. 5 is a schematic diagram of specific power in kilowatts per pound of thrust versus specific impulse in seconds and efficiency for ion engines, conventional parallel accelerators and the high efficiency parallel rail accelerator in accordance with the principle of the invention.

Figure 1:
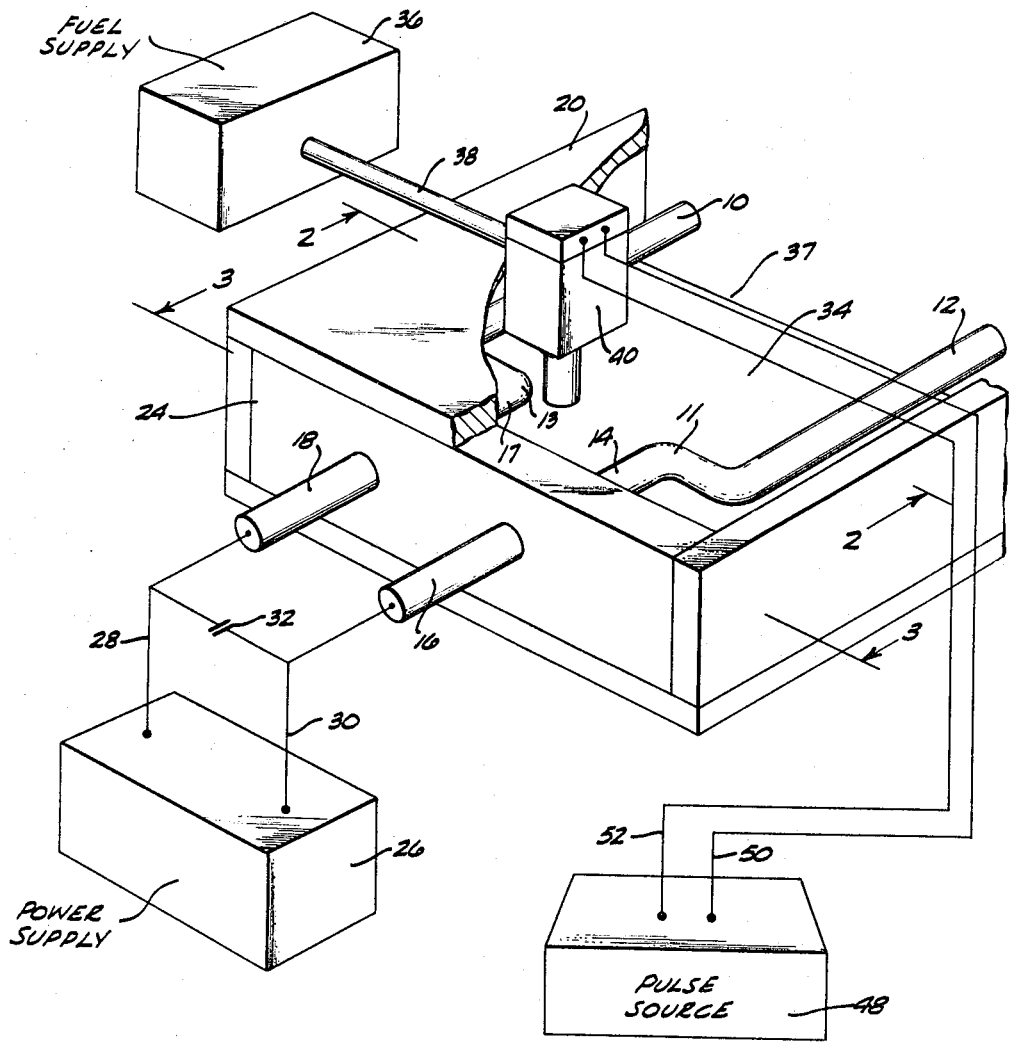
FIG. 1 is a schematic perspective and block diagram of the improved parallel rail plasma accelerator in accordance with the invention.
Figure 2:
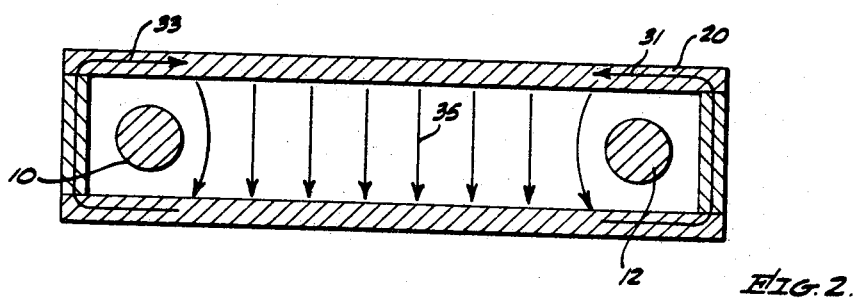
FIG. 2 is a schematic sectional diagram taken at line 2—2 of FIG. 1 for further explaining the parallel rail accelerator in accordance with the invention.
Figure 3:
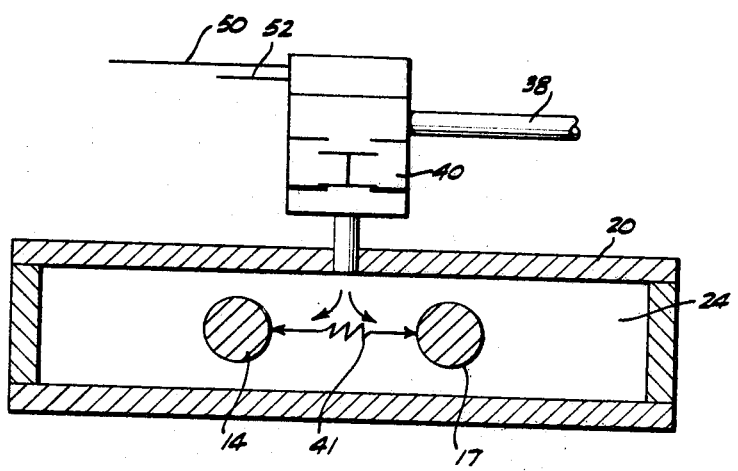
FIG. 3 is a schematic sectional diagram taken at line 3—3 of FIG. 1 for explaining the pulsed valve operation.

Referring first to FIGS. 1, 2 and 3, the parallel accelerator in accordance with the principles of the invention includes first and second conductors or rails 10 and 12 arranged substantially parallel to each other with a selected spacing and bent such as at 11 and 13 to form respective end terminals 16 and 18. The sections such as 14 and 17 of the conductors 10 and 12 are within a chamber 34. Conductors 10 and 12 may be formed of any suitable conductive material such as copper or aluminum, for example. Positioned around the conductors 10 and 12 is a magnetic enclosure or confiner 20 of a ferromagnetic material which may be powdered ferrite, an iron-nickel combination or any magnetic material, preferably having low reluctance, a high or medium permeability, a low hysteresis value, and low eddy current losses. The confining enclosure 20 directs the magnetic fields indicated by arrows 31 and 33 of FIG. 2 as developed by current flowing through the conductors 10 and 12 to provide a relatively uniform magnetic field in the space between the conductors and a relatively high inductance per unit length along the conductors 10 or 12 in the direction of the longitudinal axis of the enclosure. Because the magnetic lines of flux have a relatively short total path and a relatively short path through the ambient space, the inductance between the conductors 10 and 12 is relatively large. It is to be noted that the magnetic fields indicated by the arrow 35 have a distribution substantially parallel throughout the entire space between the rails so as to provide improved thrust efficiency. The conductors 10 and 12 are electrically isolated from the magnetic enclosure 20 either by spaces therebetween or by a suitable insulating material (not shown). To prevent arcing, external to the enclosure and at the entrance thereof, a nonmagnetic material 24 which may be any suitable insulating material such as a ceramic or boron nitride, is positioned in the enclosure 20 around the terminals 16 and 18. A power supply 26 is coupled through leads 28 and 30 to a storage capacitor 32 which in turn is coupled to the terminals 16 and 18. The capacitor 32 stores a large current charge for responding to pulses of propellant introduced into a chamber 34 of the enclosure 20 so as to develop an arc which reacts with the magnetic field between the rails indicated by the arrow 35 to drive the arc and plasma along the rails. For example, one terminal of the power supply 26 may include an inductor and the anode to cathode path of a diode for allowing the discharge operation to be performed. In order to introduce propellant into the chamber 34, a source of fuel supply 36 is coupled through a suitable conductor or tube 38 to a valve 40 which may be of the double seated type for applying pulses or "slugs" of propellant into the chamber 34 as shown in FIG. 3. The valve 40 may be positioned between the sections at 14 and 17, that is, the portions that are an extension of the terminals 16 and 18 so that an arc is readily formed. Also in accordance with the invention the valve may be positioned to supply the propellant between the widely spaced portions of the conductors 10 and 12 or between two conductors having a constant spacing along the entire lengths thereof. A control pulse source 48 is coupled through suitable leads 50 and 52 to a solenoid on the valve 40. The propellant supplied by the source 36 may be of any type of gas capable of being ionized such as ammonia, argon, nitrogen, neon or Freon and may be maintained under a substantially constant pressure as well known in the art. In response to a pulse of propellant gas entered into the chamber 34 from the valve 40, an arc indicated by an arrow 41 (FIG. 3) is formed between the conductors 10 and 12 at the adjacent portions 14 and 17 causing a magnetic field to be formed by current flowing through the conductors and the ionized gas as the capacitor 32 discharges. At the same time an opposite reaction is applied to the current flowing through the propellant (as well as to the conductors 10 and 12) which causes the propellant to be rapidly accelerated toward an exhaust opening 37 while applying an oppositely directed force from the direction of plasma movement, to the structure including the enclosure 20 and the conductors 10 and 12.

Referring now to the schematic diagram of the plasma rail accelerator of FIG. 4, the operation thereof will be explained in further detail. The power supply 26 charges the energy storage capacitor 32 to a relatively high voltage between pulses of plasma or gas propellant. A pulse of gaseous propellant is then passed through the valve 40 to the region between the electrodes or rails 10 and 12 at the ends adjacent to the sections 14 and 17 where it is ionized by the voltage maintained on the capacitor 32 to form a plasma mass 66, which for clarity of illustration is shown at a subsequent position after movement along the rails towards the opening 37. An arc 41 (FIG. 3) is then formed through the highly conductive plasma to cause the capacitor 32 to discharge and a current I to flow through the portions of the electrodes at the sections 14 and 17. As this current increases, the energy stored in the electric field of the capacitor is converted into a strong magnetic field between the electrodes 10 and 12 perpendicular to the direction of current flow in the plasma as indicated by arrow heads 60, 62 and 64. An accelerating force of an arrow 67 is thus created as the magnetic field reacts on the current flowing through the plasma 66 which accelerates the plasma to a high velocity toward the opening 37. The force of the arrow 67 has a magnitude $\iiint JXB$ where J is current density through the plasma slug 66, B is the magnetic field strength through the slug and the integral is taken over the volume of the plasma 66. This force of the arrow 67 may also be expressed in terms of $$S = \frac{I^2}{2} L'$$

where I is the current flowing and L' is the inductance per unit length in the direction of force. A reaction force equal in magnitude and oppositely directed from the force of the arrow 67 acts on the rails 10 and 12 to provide a force impulse thereto indicated by arrows 69 and 71. It is to be noted that even though the capacitor discharge may take place as an alternating current burst because of inductances in the circuit, the force on the plasma is always directed away from the power input end of the sections 11 and 13 regardless of the direction of the current flow through the rails 10 and 12 and the plasma slug 66. When the plasma mass 66 leaves the accelerator at the opening 35, the electrical energy remaining in the accelerator exists only in the energy storage capacitor 32 and the magnetic field collapses. The power supply 26 then charges the capacitor 32 to replace the expended energy, a pulse of gas is admitted after a proper time interval and another discharge and impulse force is produced. Thus, continuous pulsed operation is provided in accordance with the invention.

A parallel rail accelerator without an enclosure has a non-uniform magnetic field distribution between rails and an inductance L' per unit length of approximately:

$$L' = 0.4 \times 10^{-6} \ln \frac{D}{r} \text{ henries/meter}$$

where $D$=distance between the rails, and $r$=radius of rails. In the system in accordance with the invention utilizing an enclosure of ferrites, powdered iron or other ferromagnetic materials, the inductance per unit length has been found to be:

$$L' = 4\pi \times 10^{-7} \left(\frac{D}{2r}\right) \text{ henries/meter}$$

For example, with ¼ inch diameter rails of 2 inch spacing, $D/r$ is 16 and L' is $1.11 \times 10^{-6}$ henries per meter for the arrangement without an enclosure and L' is $10^{-5}$ henries per meter for the enclosed arrangement in accordance with the invention. The higher inductance develops a greater force against the conducting plasma and a greater reactive force against the accelerator structure.

The efficiency of the system in accordance with the invention is increased by the addition of the enclosure of magnetic material. The efficiency of the rail accelerator may be expressed by the following equation:

$$\eta = \frac{1}{1 + \frac{4R}{L'gI_0}}$$

where:

R is the total circuit resistance in ohms,
$g = 9.8$ meters/sec.$^2$,
$I_0$=specific impulse in seconds.

The resistance term R is almost entirely a function of capacitor quality and rail material and is not changed by the addition of a ferrite enclosure. However as previously discussed, L' is substantially increased by the addition of the ferromagnetic enclosure. For example, with a capacitor having a resistance of $15 \times 10^{-3}$ ohms used with the previously described rail configuration having a resistance of 5 milliohms for four inch long rails, the total circuit resistance would be 20 milliohms and the efficiency for various specific impulse times would be:

| $I_0$, sec. | $\pi$ For Parallel Rails Without Enclosure, Percent | $\pi$ For Parallel Rails With Enclosure, Percent |
|---|---|---|
| 500 | 6.4 | 38 |
| 1,000 | 12 | 15 |
| 2,000 | 21 | 71 |
| 5,000 | 40 | 86 |

Thus the electrical efficiency is greatly increased by the enclosed parallel rail accelerator in accordance with the invention.

The specific power $P/T$ may be expressed as:

$$\frac{P}{T} = 21.8\left(I_0 + \frac{4R}{L'g}\right)$$

where 21.8 is a proportionality constant.

It can be seen that thruster efficiency may be increased and specific power may be decreased at any specific impulse by maximizing the ratio $L'/R$. This selection of parameters may be accomplished by varying one or more of the rail inductance, the rail spacing, the dimensions of the cover, the resistance of the capacitor, the resistance of the rail material and the charge voltage of the capacitor. Thus, for example, the thrust may be varied during operation by controlling the charge on the capacitor 32.

The system of the invention operates with a relatively small weight compared to other types of space engines. As an illustrative example, the total weight of a parallel rail accelerator including power supply has been estimated to be 86 pounds while the total weight including power supply of an ion engine has been estimated to be 117 pounds.

Referring now to the graph of FIG. 5 showing power in kw. (kilowatts) from the power supply per pound of thrust versus specific impulse in seconds with efficiency also indicated on the graph, curves 73 and 75 are typical for ion engines, producing specific impulse values between 5000 and 10,000 seconds with very low efficiencies such as 25% and lower for specific impulse values less than 5000 seconds. The curves of FIG. 5 are derived from calculations utilizing all necessary parameters. Rocket engines have been found to develop specific impulses only up to about 400 seconds. Both rocket and ion engines have the disadvantage of excessive equipment weight, and the ion engine has the additional disadvantage of requiring considerable warm up time before operation. Curves 77 and 79 show typical operation characteristics of parallel rail accelerators without a magnetic enclosure respectively for 2.5 inch and 5.0 inch spacing of the rails or conductors. The engine of curve 77 developed 1.2 microhenry per meter $(L')$ of parallel rails along the axis and the engine of curve 69 developed 1.5 microhenry per meter $(L')$ of parallel rails. It is to be noted that with the accelerator represented by curve 77, for example, less than 50 percent efficiency and the corresponding relatively high specific power is provided for specific impulse values less than 5000 seconds. A region 81 shows the operation of a parallel rail accelerator having a ferrite enclosure in accordance with the invention with 2.5 inch rail spacing. The engine represented by region 81 develops 6 to 12 microhenries per meter length $(L')$ to parallel rails. The efficiency of the engine in accordance with the invention may be between 75 and 95% over a specific impulse range of approximately 2000 to 8000 seconds, for example. The efficiency of the confined rail accelerator may be greater than 55% between 1000 and 2000 seconds specific impulse. It is to be noted that only the confined accelerator of the invention operates in the low specific power region.

It is to be noted that the magnetic or ferromagnetic cover or enclosure 20 in accordance with the principles of the invention may be formed of plates positioned together, may be a cast enclosure or formed of bars or strips maintained together or may be of any suitable ferromagnetic or magnetic structure for providing the desired magnetic paths. Also the enclosure 20 in accordance with the invention may have configurations other than the illustrated rectangular configuration.

Thus there has been described an improved parallel rail accelerator that includes a magnetic enclosure around the rails to develop a large magnetic field between the rails. The improved parallel rail accelerator has a high efficiency over a wide range of specific impulse values. The accelerator operates in a range of specific impulse not provided with a reasonable efficiency by known space engines. Because of the relatively small weight and short warm up time, the confined parallel rail accelerator is highly desirable for attitude control during satellite station keeping or for satellite travel such as over intermediate ranges.

What is claimed is:
1. A structure for a parallel rail accelerator operating with a power source comprising
    first and second elongated conductors positioned substantially parallel to each other along an axis with a selected spacing therebetween and with first ends thereof coupled to said power supply,
    means for introducing a propellant between said conductors to form a current conductable plasma,
    and a magnetic enclosure positioned around said first and second conductors and extending parallel to a plane defined by said first and second elongated conductors and said axis and extending along said axis substantially the length of said conductors with an opening at second ends of said conductors, said enclosure being of a material having magnetic properties to direct in a closed loop the magnetic fields provided by current passing through said plasma.

2. A parallel rail accelerator structure comprising
    first and second conductors positioned substantially parallel to each other along a longitudinal axis to provide a space therebetween,
    means for periodically supplying propellant to said space between said conductors for forming plasma,
    means positioned around said conductors and extending along the axis thereof and having magnetic characteristics for directing magnetic fields developed by current flowing through said plasma and through said space between said conductors,
    and means for supplying current to said conductors.

3. A device for developing pulses of force comprising
    first and second conductor means arranged substantially parallel to each other along an axis with a space therebetween,
    means for applying pulses of current to said first and second conductor means,
    means for supplying predetermined masses of propellant between said first and second conductor means to be ionized into plasma,
    and a structure of magnetic material positioned around said first and second conductor means and extending in a direction parallel to said axis and substantially along the length of said conductor means, said magnetic material having a relatively low reluctance and said structure having substantially parallel plates positioned in planes parallel to said axis, to provide a closed magnetic path in response to current flowing through said plasma and around said conductor means in a direction at right angles to said axis.

4. A device for developing a propulsion force comprising
    a pair of conductors positioned substantially parallel to each other and with a selected spacing therebetween, each conductor of said pair having first and second ends,
    a source of current coupled to the first ends of said conductors,
    a source of ionizable gas coupled to said enclosure at a point between said conductors at the first ends thereof, for being ionized to conduct a current to develop a magnetic field between said conductors for reacting with the current flowing through said gas to force said gas to said opening,
    and an enclosure of magnetic material positioned around said pair of conductors and substantially adjacent thereto and electrically isolated therefrom to provide a space between the conductors, said enclosure having an opening at the second ends of said pair of conductors, said material having a sufficiently low reluctance, hysteresis loss and eddy current loss that magnetic fields are directed therethrough in a closed loop in a direction substantially orthogonal to the direction of said pair of conductors.

5. A parallel conductor accelerator comprising
first and second conductors positioned substantially parallel to each other along a longitudinal axis, said conductors each having first and second ends,
power supply means including a charging capacitor coupled to the first ends of said first and second conductors,
valve means coupled to said enclosure for supplying plasma between said first and second conductors substantially at the first ends thereof,
a source of control pulses coupled to said valve means for controlling said valve means to supply predetermined masses of propellant at selected intervals of time to develop plasma,
and a rectangular enclosure of magnetic material positioned around said conductors and extending in a direction parallel to said axis, said enclosure having four sides each positioned parallel to said axis to enclose said conductors and be magnetically coupled thereto while being electrically isolated therefrom, said enclosure having an opening at the second ends of said conductors, said magnetic material having a sufficiently low reluctance, hysteresis loss and eddy current loss to pass magnetic fields developed by current passing through said plasma.

6. A propulsion device comprising
first and second conductors each having first and second ends and positioned substantially parallel to each other along an axis with a space therebetween over the majority of the length thereof and a substantially smaller space over portions thereof at said first ends,
a power supply including a storage capacitor coupled to the first ends of said conductors,
a source of conductable gas positioned between said first and second conductors at said smaller space to supply said gas thereto for being ionized into current conductive plasma,
and an enclosure of magnetic material positioned around said first and second conductors and extending in a direction parallel to said axis for establishing magnetic flux paths through said spaces, said magnetic material having a sufficiently low reluctance, hysteresis loss and eddy current loss that magnetic fields are provided through said magnetic flux paths, whereby said gas is injected into said smaller space to conduct current through said rails and develop a magnetic field therebetween, said current flowing through said gas reacting with said magnetic field to force said gas to the second ends of said conductors while applying an oppositely directed force to said first and second conductors along said axis.

References Cited
UNITED STATES PATENTS 3,229,156  1/1966  Reid _____ 313—63 X

OTHER REFERENCES

Corliss, W. R.: Propulsion Systems for Space Flight, McGraw-Hill, New York, 1960 (pp. 215–220 relied on).

CARLTON R. CROYLE, *Primary Examiner.*

UNITED STATES PATENT OFFICE
CERTIFICATE OF CORRECTION

Patent No. 3,374,629

March 26, 1968

Roland A. Boucher

It is certified that error appears in the above identified patent and that said Letters Patent are hereby corrected as shown below:

Column 2, line 32, "parallel" should read -- parallel rail --; line 34, "principle" should read -- principles --; line 35, "parallel" should read -- parallel rail --. Column 4, in the heading to the table, line 1 thereof, "π", each occurrence, should read -- η --; same table, third column, line 2 thereof, "15" should read -- 55 --.

Signed and sealed this 12th day of August 1969.

(SEAL)

Attest:

Edward M. Fletcher, Jr.

Attesting Officer

WILLIAM E. SCHUYLER, JR.

Commissioner of Patents